US007454063B1

(12) United States Patent
Kneisl et al.

(10) Patent No.: US 7,454,063 B1
(45) Date of Patent: Nov. 18, 2008

(54) METHOD OF OPTICAL CHARACTER RECOGNITION USING FEATURE RECOGNITION AND BASELINE ESTIMATION

(75) Inventors: Kyle E Kneisl, Catonsville, MD (US); Jesse Otero, Baltimore, MD (US)

(73) Assignee: The United States of America as represented by the Director National Security Agency, Washington, DC (US)

( * ) Notice: Subject to any disclaimer, the term of this patent is extended or adjusted under 35 U.S.C. 154(b) by 685 days.

(21) Appl. No.: 11/233,218

(22) Filed: Sep. 22, 2005

(51) Int. Cl.
*G06K 9/34* (2006.01)
*G06K 9/18* (2006.01)
*G06K 9/00* (2006.01)
*G06K 9/48* (2006.01)
*G06K 9/46* (2006.01)
*G06K 9/72* (2006.01)
*G06K 9/36* (2006.01)
*G06K 9/20* (2006.01)

(52) U.S. Cl. .................. 382/187; 382/176; 382/177; 382/185; 382/197; 382/200; 382/202; 382/229; 382/292; 382/321

(58) Field of Classification Search .......... 382/161, 382/176–179, 182–183, 185–187, 209, 229, 382/306, 317, 321
See application file for complete search history.

(56) References Cited

U.S. PATENT DOCUMENTS

| 5,164,996 | A | | 11/1992 | Pastor | |
|---|---|---|---|---|---|
| 5,321,773 | A | * | 6/1994 | Kopec et al. | 382/209 |
| 5,396,566 | A | * | 3/1995 | Bruce et al. | 382/187 |
| 5,491,760 | A | * | 2/1996 | Withgott et al. | 382/203 |
| 5,594,810 | A | * | 1/1997 | Gourdol | 382/187 |
| 5,675,665 | A | * | 10/1997 | Lyon | 382/229 |
| 5,768,414 | A | | 6/1998 | Jamali et al. | |
| 5,774,582 | A | * | 6/1998 | Gat et al. | 382/186 |
| 5,940,533 | A | | 8/1999 | Gentric et al. | |
| 6,064,767 | A | * | 5/2000 | Muir et al. | 382/190 |
| 6,081,621 | A | * | 6/2000 | Ackner | 382/216 |
| 6,337,924 | B1 | * | 1/2002 | Smith | 382/190 |
| 2005/0105799 | A1 | * | 5/2005 | Strohecker et al. | 382/186 |
| 2005/0259866 | A1 | * | 11/2005 | Jacobs et al. | 382/157 |

OTHER PUBLICATIONS

Pechwitz et al. "Baseline Estimation for Arabic Handwritten Words", Proceedings of the Eighth International Workshop on Frontiers in Handwriting Recognition (IWFHR'02), p. 1-6.*
Chen, D. et al., "Text Detection and Recognition in Images and Video Frames", 2004, Pattern Recognition Society 37, p. 595-608.*

* cited by examiner

*Primary Examiner*—Samir A Ahmed
*Assistant Examiner*—Gandhi Thirugnanam
(74) *Attorney, Agent, or Firm*—Jennifer P. Ferragut

(57) ABSTRACT

The present invention is a method of optical character recognition. First, text is received. Next all words in the text are identified and associated with the appropriate line in the document. The directional derivative of the pixellation density function defining the text is then taken, and the highest value points for each word are identified from this equation. These highest value points are used to calculate a baseline for each word. A median anticipated baseline is also calculated and used to verify each baseline, which is corrected as necessary. Each word is then parsed into feature regions, and the features are identified through a series of complex analyses. After identifying the main features, outlying ornaments are identified and associated with appropriate features. The results are then compared to a database to identify the features and then displayed.

18 Claims, 1 Drawing Sheet

METHOD OF OPTICAL CHARACTER RECOGNITION USING FEATURE RECOGNITION AND BASELINE ESTIMATION

FIELD OF THE INVENTION

The present invention relates to image analysis and, more specifically, to image analysis by segmenting individual characters.

BACKGROUND OF THE INVENTION

Optical character recognition (OCR) refers to the process by which a document is scanned into a computer and analyzed to determine what characters appear in the document. This process eliminates the need to manually type the document into the computer system. As a result OCR systems are frequently used in situations where voluminous documents must be entered into computers or other databases for such purposes as archiving or analysis of documents. Classic OCR systems compare a scanned character to a character library to find a match for the scanned character. This classic system, while effective for standard printed characters, frequently returned erroneous results when any character set with a slight deviation from the character library was scanned. Such erroneous results require manual correction by the user, which in extreme cases could eliminate all efficiency gained from using the OCR system.

Because it is necessary in many fields to scan documents having a variety of font styles, and in some cases having handwritten data, several new OCR systems have been created. Many systems begin by attempting to break up possibly connected characters, thus correcting some of the most common errors caused by typeset or ink bleed. Because these systems were not useful for handwritten characters, but not sufficient by themselves, new methods were developed that included segmenting each character into multiple features, the relationship of the features being used in conjunction with a character library to find a character match. Other systems approximated a baseline, or other appropriate text lines, for each line of the document to ensure correct identification of the characters. Though these methods greatly improved the accuracy of OCR systems, all relied on some character or feature set that must be exactly matched to the scanned items. This greatly limited the usefulness of the systems.

U.S. Pat. No. 5,164,996, entitled "OPTICAL CHARACTER RECOGNITION BY DETECTING GEO FEATURES," discloses a system that breaks each character in an input document into features, using the association of the features for character recognition. Specifically, each character is broken up into "bays" and "lagoons." Based on the orientation of the "bays" and "lagoons" for each character a match is made to a character library. If no match is made, the system makes an assumption that multiple characters are represented and breaks up the character into multiple characters to attempt to find a match. This process can be repeated until a match is found. The present invention does not operate in this manner. U.S. Pat. No. 5,164,996 is hereby incorporated by reference into the specification of the present invention.

U.S. Pat. No. 5,768,414, entitled "SEPARATION OF TOUCHING CHARACTERS IN OPTICAL CHARACTER RECOGNITION," discloses a system and method for separating characters that are possibly connected. This system initially identifies all characters based on characters in a library. If characters are unidentified, a decision module attempts to separate the characters and match them to characters in the library. The separation process is repeated to attempt to identify all possibly connected characters in the input document. The method of the present invention does not use this method to identify characters. U.S. Pat. No. 5,768,414 is hereby incorporated by reference into the specification of the present invention.

U.S. Pat. No. 5,774,582, entitled "HANDWRITTEN RECOGNIZER WITH ESTIMATION OF REFERENCE LINES," discloses a system that estimates the location of the four principal reference lines used in writing English to assist in character recognition. After estimating each relevant baseline, the location and relevant proportions of features of a character with respect to the baselines are used to determine the characters of the input document. The features are compared to a feature library to find a "best match," taken into account proportion and location information previously determined. The present invention does not use this method to recognize characters of an input document. U.S. Pat. No. 5,774,582 is hereby incorporated by reference into the present invention.

U.S. Pat. No. 5,940,533, entitled "METHOD FOR ANALYZING CURSIVE WRITING," discloses a method of recognizing characters in cursive writing. The method first recognizes portions of letters, or primitives, and uses these primitives to construct allographs, which are typically letters. The allographs are matched to characters in a dictionary, each character being defined by a sequence of codes of primitives. This method of character recognition differs from the method of the present invention. U.S. Pat. No. 5,940,533 is hereby incorporated by reference into the specification of the present invention.

As can be seen from the prior art, optical character recognition systems place a heavy reliance on a character library for identification of data in an input document. This works very well for printed fonts, and works in some cases for cursive script as well. However, in many cases cursive script is varied and does not necessarily fall clearly into the models in the standard library. This is especially true for handwritten documents, but is also true for inherently cursive languages, such as Arabic, Hindi and Punjabi, where there are many deviations in standard writing styles. In the cases where a cursive script varies from that of the standard script in the library, the systems will either have a number of erroneously identified characters or will fail to identify several characters in the document. In most cases several processing attempts will be required before the system ultimately makes the erroneous match or determines a match cannot be made. This results in a tremendous loss of efficiency for the systems, especially when a poor result is achieved. It is therefore necessary in the art to have an efficient optical character recognition system for cursive script that does not rely on a character library to identify data in an input document.

SUMMARY OF THE INVENTION

It is an object of the present invention to provide a method of font-independent optical character recognition using feature recognition and baseline estimation.

It is a further object of the present invention to provide a method of optical character recognition using feature recognition and baseline estimation wherein statistical, topological, physical, and linguistic analyses are performed to identify features of each character.

The present invention is a computerized method for optical character recognition through feature recognition and baseline estimation. The first step of the optical character recognition method is receiving text.

The second step of the optical character recognition method is identifying the location of all words in the text.

The third step of the optical character recognition method is bounding each word in a bounding box.

The fourth step of the optical character recognition method is identifying each line in the text.

The fifth step of the optical character recognition method is grouping the bounding boxes by line.

The sixth step of the optical character recognition method is taking the directional derivative of the pixellation density function of the word contained in each bounding box.

The seventh step of the optical character recognition method is identifying the extrema of the pixellation density function for each bounding box.

The eighth step of the optical character recognition method is identifying the bottom points of vertical lines intersecting the highest value point in the directional derivative of the pixellation density function for each bounding box.

The ninth step of the optical character recognition method is calculating the median anticipated baseline using the vertical lines associated with the peak of each crest of the derivative of the pixellation density function.

The tenth step of the optical character recognition method is verifying the baseline.

The eleventh step of the optical character recognition method is correcting the baseline if the baseline approximated in the eighth step and the baseline approximated in the ninth step are not approximately equal according to user-definable tolerances.

The twelfth step of the optical character recognition method is determining the thickness of the baseline computed in the eleventh step for each word.

The thirteenth step of the optical character recognition method is parsing each word into regions in which a feature may exist.

The fourteenth step of the optical character recognition method is identifying all vertical strokes in the feature regions of each word.

The fifteenth step of the optical character recognition method is identifying the high value vertical peaks in each identified feature region.

The sixteenth step of the optical character recognition method is identifying low value vertical peaks.

The seventeenth step of the optical character recognition method is performing statistical analysis on all feature regions not previously identified to identify features.

The eighteenth step of the optical character recognition method is performing a physical analysis of all feature regions not identified in the seventeenth step of the method.

The nineteenth step of the optical character recognition method is performing a geometric analysis of all feature regions not identified in the seventeenth and eighteenth steps of the method.

The twentieth step of the optical character recognition method is performing a linguistic analysis to identify all feature regions not previously identified.

The twenty-first step of the optical character recognition method is locating and identifying ornaments.

The twenty-second step of the optical character recognition method is associating each ornament with its corresponding feature.

The twenty-third step of the optical character recognition method is identifying characters using feature list and associated ornaments.

The twenty-fourth step of the optical character recognition method is outputting the results of the twenty-third step of the method in the desired format.

DETAILED DESCRIPTION OF THE PREFERRED EMBODIMENT

Figure 1:
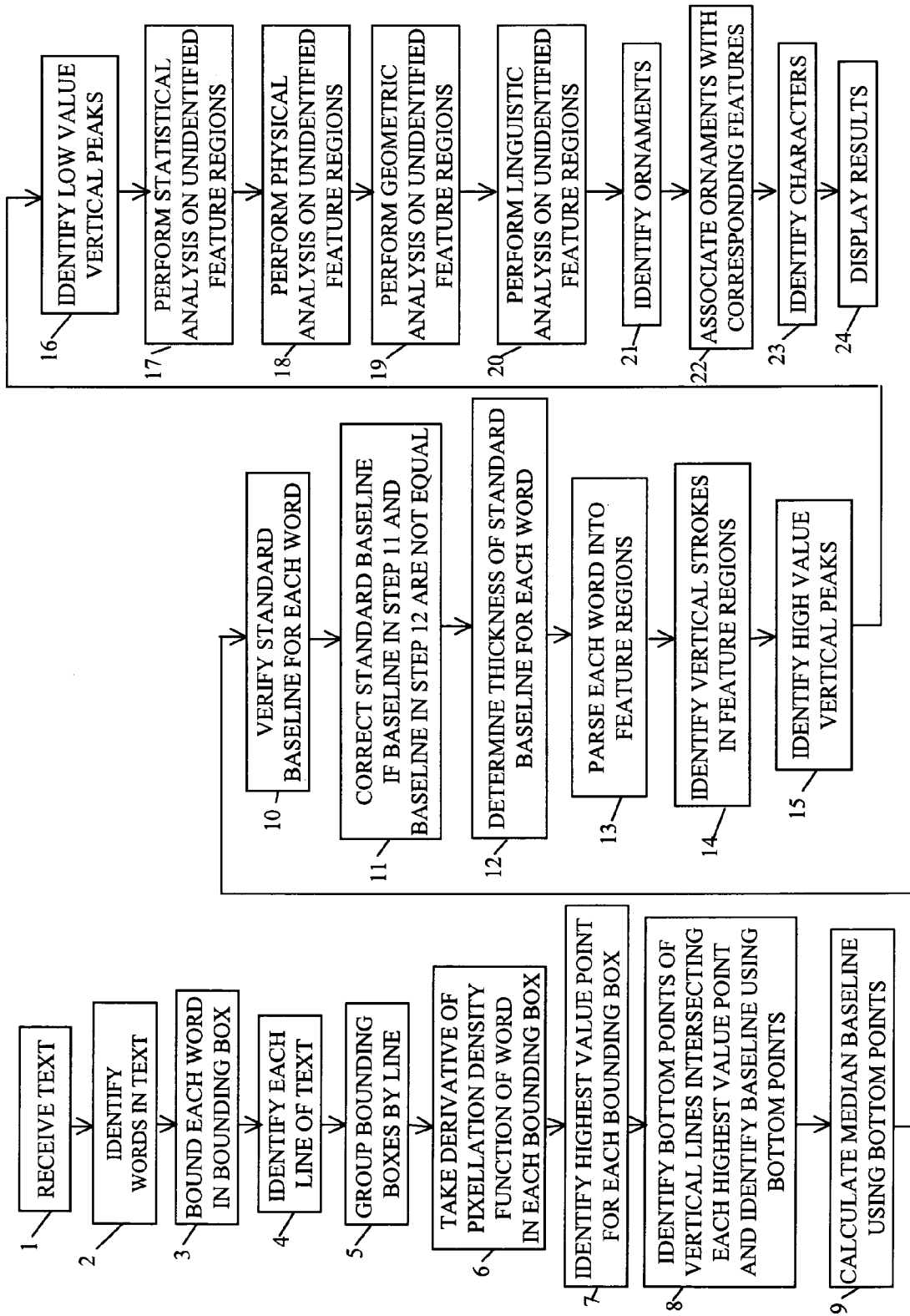
FIG. 1 is a flow chart of the optical character recognition processing step of the present invention.

The present invention is a method of font-independent optical character recognition using feature identification and baseline estimation. FIG. 1 is a list of steps of the present invention.

The first step 1 of the method, shown in FIG. 1, is receiving text. Text can be received by many methods, such as receiving data from a text document in a computer system by means of an optical scanner. As would be obvious to those of skill in the art, there are several other possible methods for receiving text, including fax and e-mail. Further, text can be in a variety of styles, languages and formats, but is preferably a language that is typeset in cursive-style, e.g., Arabic, and is and is taken from a printed document.

The second step 2 of the method is identifying the locations of all words in the text. In most languages words are separated by spaces larger than the spaces between letters. This difference is more significant when analyzing a cursive-style language. Though an occasional break may occur (such as between a capital "O" and the following letter), the breaks are significantly larger between words than between letters in a single word. The optical character recognition system of the present invention uses methods well known in the art to calculate the spaces that occur in received data. If a space exceeds a user definable threshold it is determined to be a word separator. Any data bounded by word separators is determined to be a word.

The third step 3 of the method is bounding each word in a bounding box. As was discussed in greater detail above, blank space surrounds words identified in the second step 2 of the method. This blank space defines the boundaries of each word. In the third step 3 of the method the blank space above, below and on the left and right sides of a word are used to define a bounding box. Specifically, a word is examined to determine where the lowest point is, the highest point is, the leftmost point is, and the rightmost point is. These points are then used to define a box around the word to isolate each word in the document for identification. As would be obvious to those of skill in the art, many methods can be used to perform this step, such as using the pixellation density of each word to determine the appropriate information for the word and thereafter bounding each word. As is further obvious to one of skill in the art, an actual box need not be produced, but rather appropriate calculations may be done to determine the loci of lines surrounding each word based on the points previously discussed.

The fourth step 4 of the method is identifying each line of the text. Identifying a line of text involves identifying the breaks between vertical groups of data. Specifically, in the majority of languages single-column text is grouped along horizontal rows. Between each row is empty space. As the received text is examined vertically a point will be reached where no text exists. As with the second step 2, a user definable threshold value is set for this space. At the point where this threshold is reached, the line is determined. Alternatively, because cursive text typically forms approximately a straight baseline, with occasional breaks, across a page when written, the method may identify this baseline to identify each line of text. Methods for identifying this line or determining the underlying space are obvious to those of skill in the art, such as examining the pixellation density of the data. A further alternative is to approximate a centerline through all bounding boxes. Bounding boxes having centerlines that are equal form a line of text. Bounding boxes that have no equal may be discarded. Additionally, a user definable tolerance level can be used that allows a deviation when finding equivalent centerlines. As will be obvious to those of skill in the art, many other methods of finding lines of text are possible, any of which can be used in conjunction with this invention.

The fifth step 5 of the method is grouping the bounding boxes by line. Once each line of text has been identified, each bounding box must be associated with the appropriate line of text identified in the fourth step 4 of the method. As was discussed in greater detail above, methods that exist for finding lines of text include determining an approximate baseline or centerline for a line of text. One method that can be used is determining what bounding boxes have lower limits approximately equal to the estimated baseline. All such bounding boxes would be associated with that baseline. Any unassociated bounding boxes would be matched to the baseline being closest to the lower limit of the bounding box. Another method is to draw a centerline through each bounding box and associating all bounding boxes with the line having a centerline approximately equal to the centerline of the bounding box. The centerline of the bounding box can be found by identifying the center points of the left side and right side of the defined bounding box and connecting them. Any unassociated bounding boxes are associated with a line having an estimated centerline that is closest to the centerline of the bounding box. Methods of performing both of these functions would be obvious to those of skill in the art.

The sixth step 6 is taking the directional derivative, through each horizontal location within a word box, of the pixellation density function. The pixellation density function is a function used to determine the density of pixels in a given region of an image. In Arabic text, for example, a small window near the flow of text has a high pixellation density, while the same sized window placed away from the flow of text would score low. The specific function used in conjunction with this invention is:

$$PD(y) = \sum_{x=LHS}^{RHS} \delta_{x,y} \frac{\Delta PD}{\Delta y} \simeq \frac{PD(y+1) - PD(y-1)}{2}$$

where the function $\delta_{x,y}$ is the characteristic function returning unity if the location (x,y) x,y contains an active pixel, and returns the value zero otherwise, LHS is the left hand side of the bounding box, RHS is the right hand side of the bounding box and PD is pixellation density.

With respect to cursive languages, the connections between letters would be regions of sudden change in the pixellation density. The directional derivative of the pixellation density function thus reveals, through its local extrema, the probable positions of the baseline cursive stroke.

The seventh step 7 of the method is identifying the highest value point in the directional derivative of the pixellation density function for each bounding box. To identify the highest value point, the extrema in the change of the pixellation density function are identified for each bounding box (through use of discrete directional derivatives.) As is obvious to those of skill in the art, the pixellation density function, and its discrete directional derivatives, are defined in any region; in particular they are defined for each horizontal line segment spanning the word box. The extrema among these data are identified for each bounding box in the seventh step 7 of the method.

The eighth step 8 of the method is identifying the bottom points of vertical lines intersecting the highest value point in the pixellation density function for each bounding box and approximating a baseline for each bounding box through each bottom point. As would be obvious to those of skill in the art, the derivative of the pixellation density function includes several peaks associated with letters of the word contained in each bounding box. In the eighth step 8 of the method the highest value point on the derivative of the pixellation density function is identified at each horizontal pixel slice. A horizontal pixel slice is a single horizontal or single vertical stripe of pixels, according to the orientation of the characters in the language as is obvious to those of skill in the art. For example, on an x-y plane a strip having 20 pixels in the y-direction and 1 pixel in the x-direction in a single bounding box could be a pixel slice for a typical horizontally oriented language such as English or Arabic. The bottom of a vertical line for this highest value point is approximated. To approximate a bottom, the vertical line is first approximated from the point to the base of the crest formed by the two slopes that converge at the highest value point. The baseline is then approximated through the point that represents the bottom of this vertical line. Methods of performing the functions described above are obvious to those of skill in the art, and will not be described in detail in conjunction with the present invention.

The ninth step 9 of the method is calculating the median anticipated baseline. Some of the individually computed anticipated baselines in the eighth step 8 may not represent the true baseline for that word. For each word box on a given textual line, the anticipated baseline computed in the eighth step 8 is extended a fixed distance past the final bounding box on each line of text. The end point of each anticipated baseline is then identified and the statistical median of all endpoints is calculated. A median anticipated baseline is then approximated through this median endpoint and defines a possible baseline or all words across the line of text.

The tenth step 10 of the method is verifying the baselines. To verify baselines, each baseline approximated in the eighth step 8 of the method is compared to the associated median baseline approximated in the ninth step 9 of the method. If the two baselines are approximately equal according to a user-definable threshold, no change is made to the baseline for the word computed in the eighth step 8. If the difference between the baseline approximated in the eighth step 8 and the baseline approximated in the ninth step 9 exceeds the user-defined threshold, a change may be made to the baseline in the tenth 10 step of the method, or further processing may be required prior to determine a baseline.

The eleventh step 11 of the method is correcting the baseline if the baseline approximated in the eighth step 8 and the baseline approximated in the ninth step 9 are not approximately equal according to user-definable tolerances. There are now two baseline possibilities: that which was computed in the eighth step 8, and that which was computed in ninth step 9. If it is determined in the tenth step 10 that the discrepancy between the eighth step 8 and ninth step 9 exceeds a user-definable threshold as described above, then the baseline location is changed to that which was computed in the ninth step 9 if the location specified by the ninth step 9 has pixellation density consistent with baseline, the word box location itself does not suggest that the median baseline computed on the line would be incorrect for this word (i.e., a funny isolated/offset word sitting by itself for some reason), and the bounding box geometry itself does not suggest that the bounding box is anomalous. A bounding box geometry may be determined to be anomalous according to user-defined criteria, such as the bounding box geometry differing from the geometry of all other bounding boxes by greater than a user-definable threshold or the bounding box not matching a database of user-definable geometries for the selected language.

The twelfth step 12 of the method is determining the thickness of the approximated baseline for each word. The baseline has now been located and refined. The thickness of the baseline gives the entire scale (i.e., font size) of the word. To compute this thickness, suppose a wordbox is n pixels wide. For each of the n pixels, which can be indicated by x(1), x(2), ..., x(n), we move to the coordinate (x(i), baseline) and determine the upward extent of the baseline by determining the smallest t(i) such that the coordinate (x(i), baseline+t(i)) is clear of baseline. This provides how many pixels up the baseline appear to be at a given point in the word. This procedure gives a list of thickness data, t(1), t(2), ..., t(n). After discarding any t values of 0 from this list (which occur when a baseline stroke is broken between adjoining letters), we compute the statistical mode of the t(i). This is the apparent thickness of the baseline for this word. For example, if the values for the baseline were 28 zeros, 8 fours, 27 fives, 20 sixes, 4 twelves 1 eighteen and 1 twenty the baseline thickness would be five. This is because, after discarding all zeroes, the mode of the data is five.

The thirteenth step 13 of the method is parsing each word into regions in which a feature may exist. To parse a word into regions, each baseline is scanned from right to left identifying each portion of the word as a baseline section, feature section, or empty space. As is obvious to those of skill in the art, letters in printed form are typically separated by spaces. When in cursive form, they are generally separated by a flat, horizontal region, this horizontal region being the baseline previously identified. Though exceptions do exist, such as the disconnection between the Arabic letters "waaw" or "alif" and any subsequent letters, this basic rule can be used to separate most cursive letters. Additionally spaces are sometimes used to separate letters in a single cursive word, as was explained above with respect to the second step 2 of the method. In the preferred embodiment, this is accomplished by detecting either near total lack of pixellation (for empty spaces), a region of pixellation consistent with the previously determined baseline location and thickness (for baseline areas), or any other behavior (the locations of probable features to be later identified by the optical character recognition system system). Given baseline locations and thicknesses, methods to categorize locations according to this trichotomy would be obvious to those of skill in the art.

The fourteenth step 14 is identifying from among the probable features of the thirteenth step 13 those feature regions consisting of single vertical strokes. Vertical strokes are characterized by a high pixellation density concurrent with a high height-to-width aspect ratio. The pixellation density and height-to-width aspect ratio fall within user definable must exceed a user-definable threshold for a feature region to be identified as a vertical stroke.

The fifteenth step 15 of the method is identifying the high value vertical peaks in each identified feature region. This method is particularly useful in languages such as Arabic, in which 35-40% of the features are comprised of long vertical strokes. To determine the location of long vertical strokes, the location of the features having high value vertical peaks are identified. The user may set a threshold value to determine what constitutes "high value" vertical peaks is based on the values of all points in the bounding box. For example, vertical strokes determined in the fourteenth step 14 might be defined as "high value" when their vertical extent exceeds 75% of the height of the wordbox. An equivalent alternative is to plot each word on an x-y plane, and define a value of y that a vertical must exceed to be stated as a "high value" vertical peak. Any other method of defining "high value" vertical peaks, many of which are well known in the art, may also be used in combination with the present invention.

The sixteenth step 16 of the method is identifying low value vertical peaks in each identified feature region. All vertical peaks that are not identified as "high value vertical peaks" in the fifteenth step 15 of the method are low value vertical peaks. Again, this is particularly useful in a language such as Arabic where 30-35% of the features consist of short vertical strokes. An alternative to classifying all verticals that are not previously identified as "high value vertical peaks" as "low value vertical peaks" is setting a threshold value that vertical lines previously identified must fall between to be classified as "low value" in the sixteenth step 16 of the method. Such methods of classification include setting a threshold vertical extension range or setting a threshold range on an x-y coordinate plane. Methods of performing these functions are well known to those skilled in the art.

The method proceeds to perform one or more of the seventeenth step 17 through twentieth steps 20 of the method. It will be understood by those skilled in the art that one or more of these steps may be performed according to user-defined criteria. For example, if it was determined in the fifteenth step 15 of the method that a certain feature is a high vertical feature a given subset of the steps may be performed as defined by the user. Similarly, if it is determined in the sixteenth step 16 of the method that a given feature is a low value vertical feature it will be subjected to one or more tests according to user definitions. If a feature has not been identified as either a high value vertical peak or a low value vertical peak, it must be subjected to one or more tests according to user definition.

The seventeenth step 17 of the method is performing statistical analysis on at least one feature region to identify features. Statistical analysis consists of determining characteristic features of all feature regions of a bounding box or, alternatively, all feature regions of a page and comparing the attributes of a specific feature region to those characteristics to identify the feature. Specifically, the median width of each feature region can be determined using any conventional method. The width of a specific feature region is then identified and compared to the median feature width to obtain a ratio between the two. For any given language, it is known that certain features of characters, or entire characters, have a greater width than the average of all features or characters in the lexicon. The ratio described above can be used to eliminate a number of possible features as matches for the specified feature. A user-defined tolerance can be used to allow more or less features to be eliminated as possibilities. For example, suppose the median width of all feature regions was 10 and the width of the feature was 5, the ratio would be 0.5. The user-could define a tolerance of +/−0.1 rather than requiring an exact match of 0.5 for features. The tolerance could be raised or lowered, as desired by the user, to allow a greater or lesser number of matches. Several statistical tests could be performed to further narrow the field. Such tests include height, pixellation density, and the median number of connected runs in a feature region. As is known to those in the art, a run is a group of horizontal or vertical pixels that are either all on (meaning something is visible on a computer screen) or all off (meaning nothing is visible on a computer screen.) For example, if 11110110000 represent the pixels in the vertical direction with 1 representing a pixel that is on and 0 representing a pixel that is off, there would be a run of 4 pixels followed by a run of 1 pixel followed by a run of 2 pixels followed by a run of 4 pixels. Methods of calculating these features, and performing appropriate comparisons, would be obvious to those of skill in the art.

The eighteenth step 18 of the method is performing a physical analysis of all feature regions not identified in the seventeenth step 17 of the method. For all feature regions that were not previously identified, a physical analysis is performed. A physical analysis consists of examining the physical properties of each feature region and comparing them to the characteristic physical properties of the features of the given lexicon. Methods of determining characteristic physical properties are the same as those described with respect to the statistical analysis for finding characteristic properties. Properties relevant for physical analysis include the locations of mass centroids, the values of various moments of inertia, and the radius of gyration. To accomplish this, each feature can be simulated as a physical object using appropriate techniques (such as suitably programmed software.) The physical characteristics are then determined using known methods in the art for determining such characteristics for physical objects. The attributes for a specified feature are compared to characteristics for the features of the lexicon to find a match. As with the statistical analysis, user-definable tolerances can be used to allow a broader number of matches to be found. In the preferred embodiment, comparisons are only made between the specified feature and any possible matches found in the seventeenth step 17 of the method. If no possible matches were found, then comparisons are made to all features in the lexicon.

The nineteenth step 19 of the method is performing a geometric analysis to identify the feature. In a geometric analysis, the geometric properties of the specified feature region are compared to standard geometric properties of all features of the lexicon. For example, the letter "c" always includes an opening on the right side. This geometric property is uniform through all instances of the letter. A symmetry test can be performed with the letter "o," which is perfectly symmetrical both along the horizontal and the vertical. Of course the symmetry may be distorted by individual handwriting or printer type, however this can be accounted for by allowing a user-definable tolerance when matching geometric properties of a specified feature region to the geometric properties of the features in the lexicon. Given the specific geometric properties sought, methods for performing the above comparisons are obvious to those of skill in the art. Any conventional method can be used in conjunction with this invention. In the preferred embodiment the comparison is only performed against features that were previously identified in the eighteenth 18 and nineteenth 19 steps of the method.

The twentieth step 20 of the invention is performing a linguistic analysis to identify all feature regions not previously identified. In the linguistic analysis tests are performed to identify or further verify a feature according to the linguistic properties of the feature or the function of the feature in the specified language. For example, in many languages, such as Arabic, certain features can only occur at the end of a word. Additionally, certain features can only occur in certain combinations. These rules are used to identify each feature in a feature region. Specifically, a specific feature region is identified and the feature is analyzed in relation to the surrounding identified features and according to linguistic rules to identify the unidentified feature. A good example can be found using the English language. The first letter of a word has been identified as a "Q" but the second letter could be either "u" or "v." Using linguistic analysis the second letter is now determined to be "u" as every "q" must be followed by a "u" in English. In a preferred embodiment, linguistic rules are stored in a database that can be referenced by the optical character recognition system and all features that were identified as possible matches in the seventeenth 17, eighteenth 18 and nineteenth 19 steps of the method are compared to the database to find a match.

The twenty-first step 21 of the method is identifying ornaments. Each feature region identified in the sixteenth 16 step of the method may include ornaments, such ornaments being defined as marks that are unattached to the main portion of the feature. In Arabic these ornaments, commonly referred to as diacritical markings, include dots and other diacritical markings that change the meaning of letters and words. In one method of identifying an ornament, each feature region is analyzed to find areas of pixellation density that are separated by space from the primary region of pixellation density. Many other methods exist to identify the ornaments, which would be obvious to those of skill in the art.

The twenty-second 22 step of the method is associating each ornament with its corresponding feature. In Arabic, for example, ornaments are generally located either directly above their intended receiving feature, or offset somewhat to the left of the intended receiving feature. In the preferred embodiment, the ornament is associated with the first geometric feature encountered after the identified ornament that is not to the left of the ornament's centroid.

The twenty-third step 23 of the method is identifying characters using feature list and associated ornaments. In the twenty-third 23 step of the method, a language specific database is used to identify the characters that comprise the data analyzed in the method. Specifically, each feature and/or grouping of concatenated features along with its associated ornaments comprises a letter, typically, in a given language. These features and associated ornaments are compared to similarly associated features and ornaments in a database to find a match.

The twenty-fourth step 24 in the method is displaying the results of the twenty-third step 23 of the method in the desired format. Several methods exist for displaying results, such methods including displaying the results to a computer monitor in text format, word format and HTML format. Additionally, though the data may have originally come in one linguistic form (such as Arabic,) it may be desired by the user to display the data in a transliterated form. This may be performed in this step according to user preferences. Such transliteration information may be stored in the database used to match the feature/ornament combinations in the twenty-third step 23 of the method.

What is claimed is:

1. A method of optical character recognition, comprising the steps of:
   a) receiving an image with text;
   b) identifying all locations of words in the text;
   c) bounding each word in a bounding box;
   d) identifying each line in the text;
   e) grouping the bounding boxes by each line of text identified in step (d);
   f) calculating a directional vertical derivative of a pixellation density function of the words contained in each bounding box;
   g) identifying the highest value point in the directional vertical derivative of the pixellation density function for each bounding box;
   h) identifying the bottom points of vertical lines intersecting the highest value point in the pixellation density function for each bounding box, wherein each vertical line terminates at the base of the crest that includes the highest value point;

i) approximating a first baseline for each word, each first baseline intersecting a bottom point;

j) calculating a median anticipated baseline for each word, wherein calculating the median anticipated baseline comprises extending each baseline approximated in step (i) a user-definable fixed distance past the final bounding box on each line of text, identifying an endpoint of each approximated baseline, calculating the statistical median of all endpoints, and approximating a median anticipated baseline through the calculated median endpoints;

k) verifying the first baseline for each word is the standard baseline;

l) determining the standard baseline if the difference between the first baseline approximated in step (i) for each bounding box and the median anticipated baseline approximated in step (j) is greater than a user-definable number of pixels in the y-direction on an x-y plane for each bounding box;

m) determining the thickness of the standard baseline for each word;

n) parsing each word into regions in which a feature may exist;

o) identifying all vertical strokes in the regions identified in step (n);

p) identifying the high value vertical peaks in each region identified in step (o);

q) identifying low value vertical peaks in each region (identified in step (o);

r) performing at least one of a statistical analysis, a physical analysis, a geometric analysis, and a linguistic analysis on at least one region identified in step (n) to identify all feature regions not identified in steps (o) and (p);

s) locating and identifying ornaments;

t) associating each ornament with its corresponding feature;

u) identifying characters by comparing the identified feature and associated ornaments to a user-definable database; and v) displaying the results of step (u) in a user-definable format.

2. The method of claim 1, wherein the step of calculating the directional derivative of the pixellation density function comprises calculating the directional derivative of the pixellation density function comprises wherein the pixellation density function is calculated according to the equation $$PD(y) = \sum_{x=LHS}^{RHS} \delta_{x,y} \frac{\Delta PD}{\Delta y} \simeq \frac{PD(y+1) - PD(y-1)}{2}$$

And wherein PD is the pixellation density, RHS is the right hand side of the text in a bounding box, LHS is the left hand side of the bounding box, and $\delta_{x,y}$ is the characteristic function returning unity if the location (x,y) contains an active pixel, and returns the value zero otherwise.

3. The method of claim 2, wherein the step of verifying the first baseline for each word is an accurate baseline comprises verifying the first baseline is the standard baseline, wherein the first baseline is verified as the standard baseline if the pixel difference in the y-plane between the first baseline and the median anticipated baseline does not exceed a user-definable threshold.

4. The method of claim 3, wherein the step of identifying the high value vertical peaks in each identified feature region further comprises setting a threshold value to determine what constitutes high value vertical peaks based on the values of all points in the bounding box.

5. The method of claim 4, wherein the step of identifying characters by comparing the identified feature and associated ornaments to a user-definable database further comprises comparing identified features and associated ornaments to similarly associated features and ornaments in a database to find a match.

6. The method of claim 5, wherein the step of performing a statistical analysis on at least one feature region further comprises determining characteristic features of a feature region of a page and comparing the attributes of a specific feature region to those characteristics to identify the feature.

7. The method of claim 6, wherein the step of performing a physical analysis of at least one feature region further comprises examining the physical properties of each feature region and comparing them to the characteristic physical properties of the features of the given lexicon.

8. The method of claim 7, wherein the step of verifying the first baseline for each word is the standard baseline comprises verifying the first baseline is the standard baseline, wherein the first baseline is verified as an accurate baseline if the pixel difference in the y-plane between the first baseline and the median anticipated baseline does not exceed a user-definable threshold or if the difference does exceed a user-definable threshold and median anticipated baseline does not have a pixellation density consistent with the baseline, the associated bounding box location compared to the median anticipated baseline location exceeds a user-definable tolerance, or the geometry of the text in the bounding box meets a user-specified criteria, otherwise substituting the median anticipated baseline for the first baseline.

9. The method of claim 8, wherein the step of performing a linguistic analysis of at least one feature region further comprises performing linguistic analysis tests to identify a feature according to the linguistic properties of the feature and wherein linguistic rules are stored in a database and compared with all features that were identified as possible matches in previous analyses to find a match.

10. The method of claim 1, wherein the step of verifying the first baseline for each word is the standard baseline comprises verifying the first baseline is an accurate baseline, wherein the first baseline is verified as the standard baseline if the pixel difference in the y-plane between the first baseline and the median anticipated baseline does not exceed a user-definable threshold.

11. The method of claim 1, wherein the step of identifying the high value vertical peaks in each identified feature region further comprises setting a threshold value to determine what constitutes high value vertical peaks based on the values of all points in the bounding box.

12. The method of claim 1, wherein the step of identifying characters by comparing the identified feature and associated ornaments to a user-definable database further comprises comparing identified features and associated ornaments to similarly associated features and ornaments in a database to find a match.

13. The method of claim 1, wherein the step of performing a statistical analysis on at least one feature region further comprises determining characteristic features of at least one feature region of a page and comparing the attributes of a specific feature region to those characteristics to identify the feature.

14. The method of claim 1, wherein the step of performing a physical analysis of at least one feature region further comprises examining the physical properties of a feature region and comparing them to the characteristic physical properties of the features of the given lexicon.

15. The method of claim 1, wherein the step of verifying the first baseline for each word is the standard baseline comprises verifying the first baseline is the standard baseline, wherein the first baseline is verified as an accurate baseline if the pixel difference in the y-plane between the first baseline and the median anticipated baseline does not exceed a user-definable threshold or if the difference does exceed a user-definable threshold and median anticipated baseline does not have a pixellation density consistent with the baseline, the associated bounding box location compared to the median anticipated baseline location exceeds a user-definable tolerance, or the geometry of the text in the bounding box meets a user-specified criteria, otherwise substituting the median anticipated baseline for the first baseline.

16. The method of claim 1, wherein the step of performing a linguistic analysis of at least one feature region further comprises performing linguistic analysis tests to identify a feature according to the linguistic properties of the feature and wherein linguistic rules are stored in a database and compared with all features that were identified as possible matches in the previous analyses to find a match.

17. The method of claim 1, wherein the step of calculating a median anticipated baseline further consists of calculating the median anticipated baseline using the bottom points of the vertical lines associated with the peak of each crest of the derivative of the pixellation density function, wherein the median anticipated baseline is calculated by plotting each crest on an x-y plane, taking an average of the y-coordinates associated with each bottom point and plotting a zero-slope horizontal line having a y-coordinate equal to the resulting average y-coordinate.

18. The method of claim 9, wherein the step of calculating a median anticipated baseline further consists of calculating the median anticipated baseline using the bottom points of the vertical lines associated with the peak of each crest of the derivative of the pixellation density function, wherein the median anticipated baseline is calculated by plotting each crest on an x-y plane, taking an average of the y-coordinates associated with each bottom point and plotting a zero-slope horizontal line having a y-coordinate equal to the resulting average y-coordinate.

* * * * *